United States Patent
Hong et al.

(10) Patent No.: US 9,694,512 B2
(45) Date of Patent: Jul. 4, 2017

(54) BRAZING BOND TYPE DIAMOND TOOL WITH EXCELLENT CUTTABILITY AND METHOD OF MANUFACTURING THE SAME

(71) Applicant: EHWA Diamond Industrial Co., Ltd., Osan-si, Gyeonggi-do (KR)

(72) Inventors: Jae-Hyun Hong, Hwaseong-si (KR); Jong Suk Choi, Seoul (KR); Young Choul Song, Osan-si (KR)

(73) Assignee: EHWA Diamond Industrial Co., Ltd., Osan-si, Gyeonggi-Do (KR)

( * ) Notice: Subject to any disclaimer, the term of this patent is extended or adjusted under 35 U.S.C. 154(b) by 74 days.

(21) Appl. No.: 14/817,030

(22) Filed: Aug. 3, 2015

(65) Prior Publication Data

US 2015/0336291 A1    Nov. 26, 2015

Related U.S. Application Data

(63) Continuation-in-part of application No. 13/565,449, filed on Aug. 2, 2012, now abandoned.

(30) Foreign Application Priority Data

Sep. 7, 2011  (KR) ......................... 10-2011-0090504

(51) Int. Cl.
  *B28D 1/12* (2006.01)
  *B23D 61/02* (2006.01)
  *B23D 61/04* (2006.01)
(52) U.S. Cl.
  CPC ........... *B28D 1/121* (2013.01); *B23D 61/028* (2013.01); *B23D 61/04* (2013.01)
(58) Field of Classification Search
  None
  See application file for complete search history.

(56) References Cited

U.S. PATENT DOCUMENTS 3,092,094 A * 6/1963 Griffin .................. B24D 5/12
                                                              125/15
3,474,655 A   10/1969 Fulkerson
(Continued)

FOREIGN PATENT DOCUMENTS

CN    1953843 A    4/2007
CN    102172900 A   9/2011
(Continued)

OTHER PUBLICATIONS

European Office Action dated May 27, 2015 in connection with the counterpart European Application No. 12179813.6.
(Continued)

*Primary Examiner* — Joseph J Hail
*Assistant Examiner* — Brian Keller
(74) *Attorney, Agent, or Firm* — Hauptman Ham, LLP

(57) ABSTRACT

The present disclosure provides a brazing bond type diamond tool having excellent cuttability. The diamond tool includes a shank having a body with a thickness of 2 mm or less and a tip portion formed along an edge of the body, the tip portion being thinner than the body; and a brazing bond layer formed on the tip portion of the shank to secure diamond particles having a particle size of 25 to 50 mesh with a brazing bond, wherein the brazing bond layer has a greater thickness than a difference between half the thickness of the shank body and half the thickness of the shank tip portion, such that some part of the shank body can penetrate into a surface of an object to be cut, and the tip portion of the shank has a curved surface at an end thereof.

4 Claims, 6 Drawing Sheets

(56) References Cited

U.S. PATENT DOCUMENTS

| | | |
|---|---|---|
| 3,894,673 A | 7/1975 | Lowder et al. |
| 4,018,576 A | 4/1977 | Lowder et al. |
| 4,637,370 A | 1/1987 | Ishizuka |
| 4,908,046 A | 3/1990 | Wiand |
| 4,925,457 A | 5/1990 | deKok et al. |
| 5,020,282 A | 6/1991 | Okajima et al. |
| 5,131,924 A | 7/1992 | Wiand |
| 5,429,016 A | 7/1995 | Rowlett |
| 5,611,326 A | 3/1997 | Caspani et al. |
| 5,817,204 A | 10/1998 | Tselesin |
| 5,980,678 A | 11/1999 | Tselesin |
| 6,039,641 A | 3/2000 | Sung |
| 6,098,609 A | 8/2000 | Ishizuka |
| 6,159,286 A | 12/2000 | Sung |
| 6,286,498 B1 | 9/2001 | Sung |
| 6,368,198 B1 | 4/2002 | Sung et al. |
| 6,416,878 B2 | 7/2002 | An |
| 6,638,153 B2 | 10/2003 | Lee et al. |
| 6,641,381 B2 | 11/2003 | Ball |
| 6,679,243 B2 | 1/2004 | Sung |
| 6,769,975 B2 | 8/2004 | Sagawa |
| 7,124,753 B2 | 10/2006 | Sung |
| 7,337,775 B2 | 3/2008 | Kim et al. |
| 8,075,662 B2 | 12/2011 | Minor et al. |
| 8,192,256 B2 * | 6/2012 | Andrews ............... B24B 53/14 125/11.02 |
| 8,197,747 B2 | 6/2012 | Huang |
| 2001/0033804 A1 | 10/2001 | An |
| 2005/0260939 A1 | 11/2005 | Andrews et al. |
| 2007/0051355 A1 | 3/2007 | Sung |
| 2007/0151554 A1 | 7/2007 | Song et al. |
| 2009/0229592 A1 | 9/2009 | Kim et al. |
| 2009/0266446 A1 | 10/2009 | Minor et al. |
| 2010/0031947 A1 | 2/2010 | Duggan |
| 2010/0038412 A1 | 2/2010 | Huang |
| 2010/0043304 A1 | 2/2010 | Lee et al. |
| 2010/0326416 A1 | 12/2010 | Schwarz |
| 2011/0039479 A1 | 2/2011 | Beyer |
| 2013/0059510 A1 | 3/2013 | Hong et al. |

FOREIGN PATENT DOCUMENTS

| | | |
|---|---|---|
| JP | 5080895 U | 7/1975 |
| JP | 2000254915 A | 9/2000 |
| KR | 20020020503 A | 3/2002 |
| KR | 20030071088 A | 9/2003 |
| KR | 10-0491965 | 5/2005 |
| KR | 20050089674 A | 9/2005 |
| KR | 10-2010-0070584 A | 6/2010 |
| WO | 0006340 A1 | 2/2000 |

OTHER PUBLICATIONS

Chinese Office Action dated Jan. 12, 2015.
Chinese Office Action dated May 30, 2014.

* cited by examiner (a)

(b)

BRAZING BOND TYPE DIAMOND TOOL WITH EXCELLENT CUTTABILITY AND METHOD OF MANUFACTURING THE SAME

CROSS-REFERENCE TO RELATED APPLICATION

This is a Continuation-In-Part of U.S. patent application Ser. No. 13/565,449 filed Aug. 2, 2012, an application claiming the benefit to Korean Application No. 10-2011-0090504, filed on Sep. 7, 2011, the content of each of which is hereby incorporated by reference in its entirety.

BACKGROUND

1. Technical Field

The present invention relates to a technique for manufacturing a diamond tool, and, more particularly, to a brazing bond type diamond tool which has improved cuttability through a unique shank structure, and a method of manufacturing the same.

2. Description of the Related Art

A general diamond tool is manufactured by welding a metal powder sintered compact having diamond particles to a shank constituting a main body of the diamond tool. The metal powder sintered compact acts as a bonding material for securing the diamond particles.

Such a diamond tool has a problem with low impact strength.

To solve this problem, Korean Patent Publication No. 10-2000-0053707 (published on Sep. 5, 2000) discloses a technique of forming a brazing bond by depositing a slurry solution of a brazing metal bond onto a substrate and dispersing diamond particles therein, followed by heating to a temperature of about 1300° C. or less.

For the diamond tool manufactured by the method disclosed in this publication, a brazing bond layer is formed on a tip portion formed along an edge of a shank. The brazing bond layer includes a brazing bond and diamond particles. Accordingly, a cutting section of the diamond tool participating in cutting operation has a very high thickness, which is determined by the sum of the thickness of the tip portion and the thicknesses of the brazing bond layer at both sides of the tip portion.

Thus, considering that the diamond tool has increased cuttability with decreasing thickness of the cutting section until it reaches a certain thickness value, the brazing bond type diamond tool does not have high cuttability.

BRIEF SUMMARY

Embodiments of the present invention provide a brazing bond type diamond tool which has improved cuttability through a unique shank structure.

In accordance with one aspect of the present invention, a diamond tool includes: a shank having a body with a thickness of 2 mm or less and a tip portion formed along an edge of the body, the tip portion being thinner than the body; and a brazing bond layer formed on the tip portion of the shank to secure diamond particles having a particle size of 25 to 50 mesh with a brazing bond, wherein the brazing bond layer has a greater thickness than a difference between half the thickness of the shank body and half the thickness of the shank tip portion, such that some part of the shank body can penetrate into a surface of an object to be cut, and the tip portion of the shank has a curved surface at an end thereof.

The diamond particles may be arranged in a single layer on the brazing bond layer.

A value obtained by subtracting a difference between half the thickness of the shank body and half the thickness of the shank tip portion from the thickness of the brazing bond layer may range from 10% to 70% the particle size of the diamond particles.

The tip portion may have a thickness ranging from 50% to 80% the thickness of the body.

The curved surface of the tip portion may have a radius of curvature greater than or equal to half the thickness of a plane section of the tip portion.

The diamond tool may be a flat blade type diamond tool.

In accordance with another aspect of the present invention, a method of manufacturing a diamond tool includes: (a) preparing a shank including a body and a tip portion formed along an edge of the body, the tip portion being thinner than the body; (b) depositing a metal powder for forming a brazing bond on the tip portion of the shank; (c) setting diamond particles on the tip portion having the metal powder deposited thereon; and (d) melting the metal powder to form the brazing bond.

According to the present invention, in the brazing bond type diamond tool, the tip portion of the shank is thinner than the shank body. As a result, when a brazing bond layer includes diamond particles, the overall thickness of the cutting section becomes slightly greater than the thickness of the shank body. Accordingly, the brazing bond type diamond tool may have improved cuttability through a thin cutting section and allows some part of the shank body to penetrate into a surface of an object to be cut during cutting, thereby providing deep cutting.

In the brazing bond type diamond tool according to the present invention, the shank body preferably has a thickness of up to 2.0 mm.

In addition, in the brazing bond type diamond tool according to the present invention, the tip portion of the shank has a curved surface at an end thereof, and thus allows diamond particles to be continuously arranged, can reduce probability of separation of diamond particles during cutting, and allows much more diamond particles to be arranged due to increased specific surface area thereof.

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION

Figure 1:
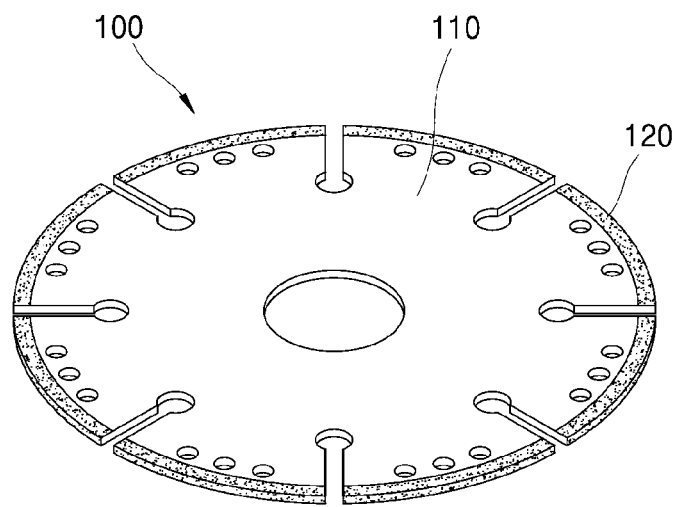
FIG. 1 is a perspective view of a brazing bond type flat blade-shaped diamond tool in accordance with one embodiment of the present invention.

Embodiments of the present invention will now be described in detail with reference to the accompanying drawings. It should be understood that the present invention is not limited to the following embodiments and may be embodied in different ways, and that the embodiments are given to provide complete disclosure of the present invention and to provide thorough understanding of the invention to those skilled in the art. The scope of the invention is limited only by the accompanying claims and equivalents thereof. Like components will be denoted by like reference numerals throughout the specification.

FIG. 1 is a perspective view of a brazing bond type flat blade-shaped diamond tool in accordance with one embodiment of the present invention.

Referring to FIG. 1, a brazing bond type diamond tool includes a shank 110 and a brazing bond layer 120.

The shank 110 is made of steel such as carbon tool steel, alloy tool steel, and the like, and corresponds to a main body of the diamond tool.

The shank 110 may be divided into a body formed at a central region of the shank and a tip portion formed along an edge of the body. Although the body is not distinguished from the tip portion via a clear border, an edge of the shank having a brazing bond layer formed thereon may be regarded as the tip portion.

According to the present invention, the tip portion of the shank 110 has a smaller thickness than the body thereof. This structure will be described in more detail below with reference to FIG. 2 and FIG. 3.

The brazing bond layer 120 is formed on the tip portion of the shank and has diamond particles 121 secured by a brazing bond 122. The brazing bond 122 may be formed by brazing a metal powder.

Figure 6:
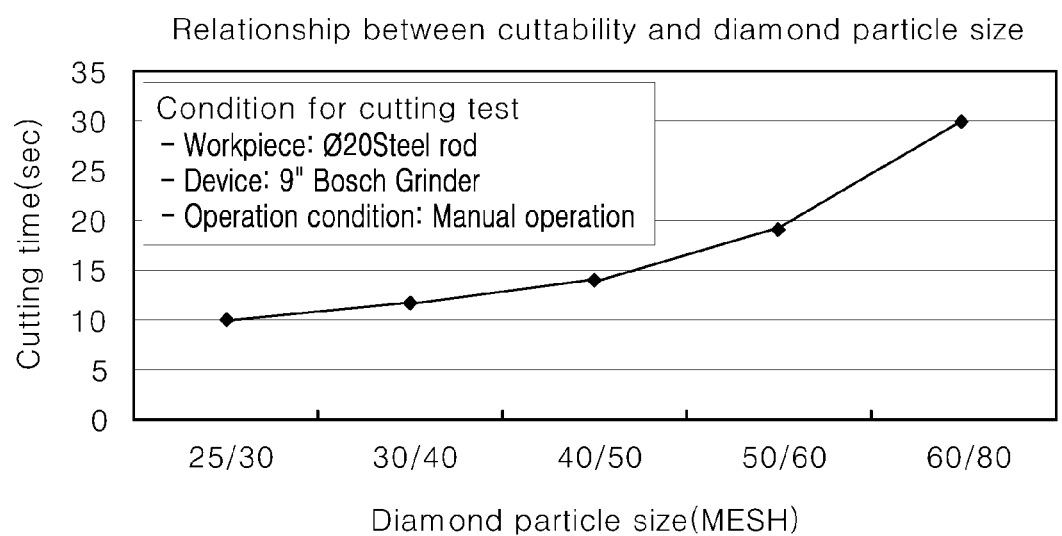
FIG. 6 is a graph depicting a relationship between cutting time and particle size of diamond particles.

FIG. 6 is a graph depicting a relationship between cutting time and particle size of diamond particles.

Referring to FIG. 6, as the average particle size of the diamond particles decreases in terms of mesh value, that is, as the size of the diamond particles increases, cutting time is decreased, thereby providing good cuttability. Here, if the size of the diamond particles is excessively large, the diamond particles cannot be stably secured by the brazing bond.

Thus, the diamond particles 121 secured by the brazing bond layer 120 may have an average particle diameter ranging from 25 to 50 mesh.

If the average particle diameter of the diamond particles is less than 25 mesh, the diamond tool has good cuttability. However, in this case, the diamond particles have an excessively large particle size, and thus the brazing bond does not stably secure the diamond particles, so that the diamond particles can be easily separated from the shank, thereby reducing the lifespan of the diamond tool.

On the contrary, if the diamond particles have an average particle diameter exceeding 50 mesh, the diamond particles have an excessively small particle size, and thus an exposed height of the diamond particles from the brazing bond layer is low, thereby causing deterioration in cuttability of the diamond tool.

The diamond particles may be arranged in a single layer on the brazing bond layer to adjust the thickness of the brazing bond in consideration of cuttability.

The brazing bond may be formed by brazing a Ni-based metal powder comprising 1~10 wt % of silicon (Si), 5~15 wt % of chromium (Cr), 5~15 wt % of cobalt (Co), and the balance of nickel, without being limited thereto. Such a Ni-based metal powder advantageously exhibits excellent coupling force with respect to steel, which is used as a material for the shank.

In the nickel-based metal powder, cobalt and chromium assist in chemical coupling between the brazing bond, the diamond particles and the shank.

Each of chromium and the cobalt may be present in an amount of 5~15 wt % based on the total weight of the brazing 6bond. If the amount of chromium or cobalt is less than 5 wt %, the coupling force between the brazing bond and the diamond particles or the shank is low, causing deterioration in lifespan of the diamond tool. On the contrary, if the amount of chromium or cobalt exceeds 15 wt %, the diamond particles undergo excessive chemical coupling, which causes deterioration in strength of the diamond particles.

Further, in the nickel-based metal powder, silicon serves to improve flowability of the brazing bond formed by brazing the metal powder.

Silicon may be present in an amount of 1~10 wt % based on the total amount of the brazing bond. An amount of silicon less than 1 wt % results in insufficient effect obtained by the use of silicon, and an amount of silicon exceeding 10 wt % provides excessively high flowability to the brazing bond, causing the brazing bond to flow instead of holding the diamond particles.

Further, the nickel-based metal powder may further contain metals such as boron, phosphorous, tin, and the like in order to enhance the flowability of the brazing bond. In this case, the amount of nickel is reduced corresponding to the amounts of the additional metal components. These additional metal components may be present in an amount of 10 wt % or less based on the total amount of the brazing bond. The amount of the additional metal components exceeding 10 wt % provides excessively high flowability to the brazing bond, causing the brazing bond to flow instead of holding the diamond particles.

Figure 2:
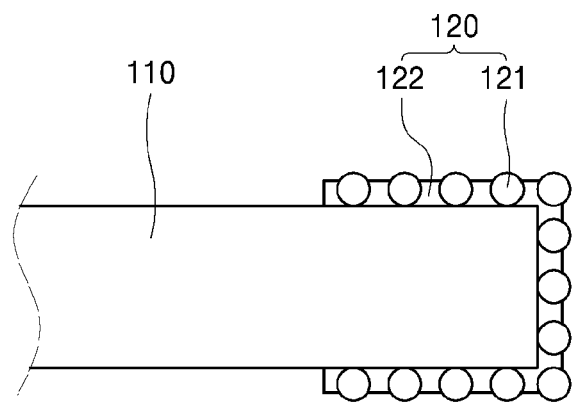
FIG. 2 is a sectional view of one example of a brazing bond layer formed on a shank in which a shank body has the same thickness as that of a tip portion of the shank.
Figure 3:
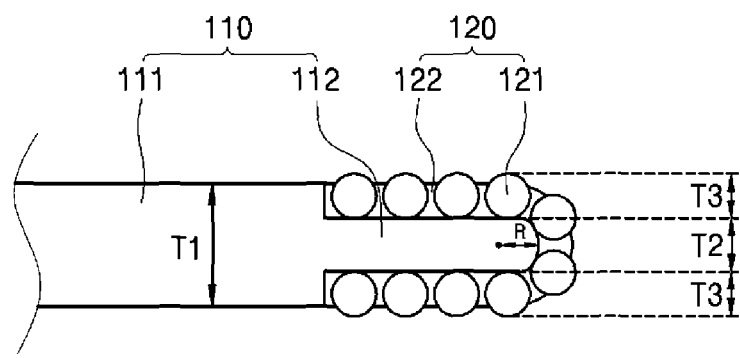
FIG. 3 is a sectional view of one example of a brazing bond layer formed on a shank of the brazing bond type diamond tool in accordance with the embodiment of the present invention.

FIG. 2 is a sectional view of one example of a brazing bond layer formed on a shank in which a shank body has the same thickness as that of a tip portion of the shank, and FIG. 3 is a sectional view of one example of a brazing bond layer formed on a shank in which a tip portion of the shank has a smaller thickness than a shank body.

A section of the diamond tool participating in cutting (hereinafter, "cutting section") may be composed of the tip portion and the brazing bond layer 120 of the shank 110. As described above, as the cutting section becomes thinner, the cutting plane becomes sharper, thereby providing better cuttability.

Reduction in thickness of the cutting section may be achieved by reducing the thickness of the shank or the size of the diamond particles. However, when the shank has a small thickness, the diamond tool is likely to tremble during rotation at high speed, and when the diamond particles have a small size, the diamond tool can be deteriorated in cuttability. Accordingly, a conventional brazing bond type diamond tool has a limit in improvement of cuttability.

On the other hand, the present invention provides a brazing type diamond tool which has a unique shank structure so as not to suffer from trembling during rotation at high speed while ensuring good cuttability.

In a conventional brazing bond type diamond tool as shown in FIG. 2, the shank body has the same thickness as that of the tip portion. Thus, the cutting section of the diamond tool including the tip portion of the shank and the brazing bond layer has a greater thickness than the diamond tool in FIG. 3. On the other hand, for the brazing bond type diamond tool according to the present invention as shown in FIG. 3, the cutting section of the diamond tool including the tip portion of the shank and the brazing bond layer has a relatively small thickness due to reduction in thickness of the tip portion, as compared with that of the diamond tool in FIG. 2.

Referring to FIG. 3, the sum of thickness T2 of the shank tip portion 112 and thickness T3 of upper and lower portions of the brazing bond layer 120 is slightly greater than the thickness of the shank body 111.

Here, for the diamond tool according to the present invention, the body of the shank 110 may have a thickness of 2.0 mm or less. If the shank body has an excessively large thickness, the cutting section is increased in thickness, thereby causing deterioration in cuttability and increase in processing amount due to a need for reduction of the thickness of the tip portion. On the other hand, if the shank body has an excessively small thickness, the diamond tool is likely to tremble during rotation at high speed, or to suffer from warpage of the shank. Thus, the shank body preferably has a thickness of 1.0 mm to 2.0 mm.

Figure 4:
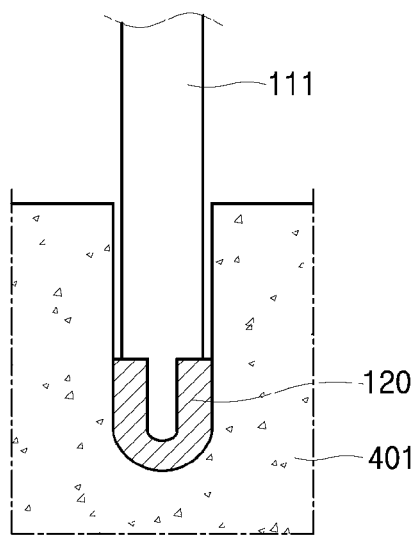
FIG. 4 is a view comparing cutting depth achieved by two diamond tools each having a brazing bond layer of the same thickness, in which (a) shows a cutting depth when using the diamond tool according to the present invention and (b) shows a cutting depth when using a diamond tool in which a cutting section has a smaller thickness than a shank body.
Figure 4:
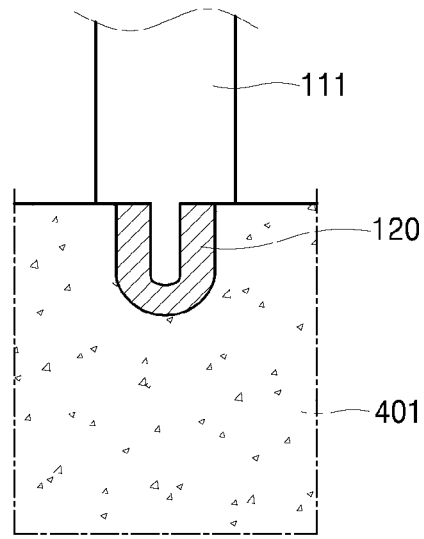

The diamond tool according to the present invention allows some part of the shank body 111 to penetrate into a surface of an object to be cut 401, as shown in FIG. 4(a). This allows deep cutting. To this end, the thickness T3 of the brazing bond layer is larger than a difference (T1/2−T2/2) between half the thickness (T1/2) of the shank body and half the thickness (T2/2) of the shank tip portion. Otherwise, only the tip portion can penetrate into the surface of an object to be cut and the body cannot penetrate thereinto, as shown in FIG. 4(b).

In addition, it is desirable that the tip portion 112 of the shank have a curved surface at an end thereof, as shown in FIG. 3. When the tip portion has a curved surface at the end thereof, the tip portion does not have any angled corner, which allows the diamond particles to be continuously arranged while preventing separation of the diamond particles during cutting, which otherwise would mainly occur at angled corners of the tip portion. In addition, the tip portion has increased surface area, which allows increase in the number of diamond particles, thereby improving cuttability.

A value obtained by subtracting a difference between half the thickness of the shank body and half the thickness of the shank tip portion from the thickness of the brazing bond layer, that is, the thickness of a portion of the brazing bond layer protruding from the shank body may range from 10% to 70% the particle size of the diamond particles. If this value is less than 10%, the tip portion has an excessively small thickness, thereby causing deterioration in stiffness of the tip portion during cutting, whereas, if this value exceeds 70%, the cutting section has an increased thickness, thereby causing deterioration in cuttability.

The tip portion may have a thickness ranging from 50% to 80% the thickness of the shank body. If the thickness of the tip portion does not satisfy the above range, this can cause the same problems as those which occur when the thickness of the brazing bond layer is out of the range as described above.

Further, the curved surface of the tip portion advantageously has a radius of curvature greater than or equal to half the thickness of a plane section of the tip portion. If the tip portion has an excessively small radius of curvature, the tip portion has an excessively large length, causing excessive increase in processing amount.

In addition, the length of the tip portion advantageously is one to three times the thickness T1 of the shank body. If the length of the tip portion is excessively small as compared with the thickness of the shank body, it is difficult to maintain stiffness of the tip portion during cutting, whereas, if the length of the tip portion is excessively large as compared with the thickness of the shank body, the brazing bond layer is likely to suffer from cracking.

Although the flat blade-shaped diamond tools are illustrated as the examples of the brazing bond type diamond tool in FIGS. 1 and 3, the present invention is not limited thereto. The present invention may be applied to brazing bond type diamond tools of different shapes, such as a cup shape, a core drill shape, and the like.

Figure 5:
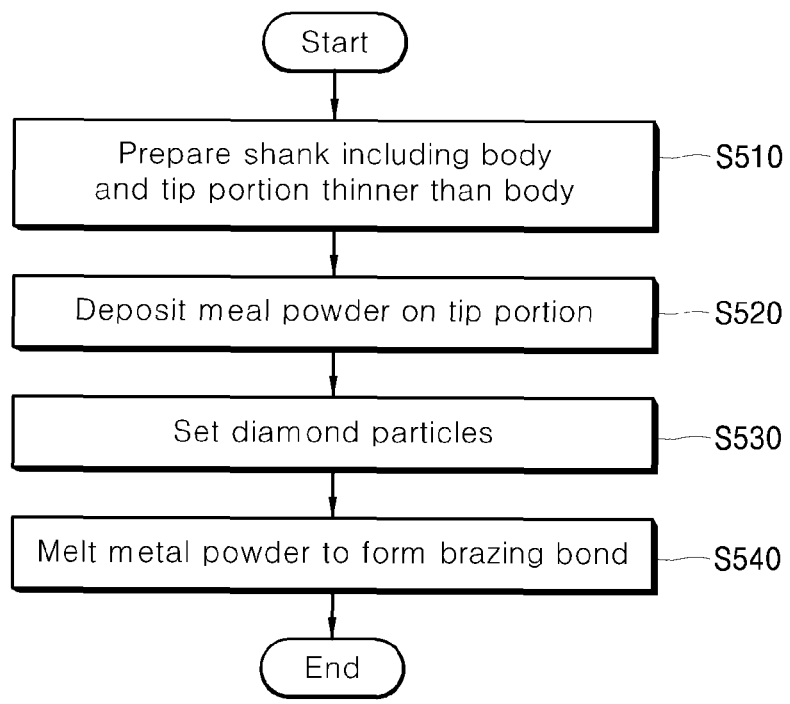
FIG. 5 is a flowchart of a method of manufacturing a brazing bond type diamond tool in accordance with one embodiment of the present invention.

FIG. 5 is a flowchart of a method of manufacturing a brazing bond type diamond tool in accordance with one embodiment of the present invention.

Referring to FIG. 5, the method of manufacturing a brazing bond type diamond tool according to this embodiment includes preparing a shank (S510), depositing a metal powder (S520), setting diamond particles (S530), and forming a brazing bond (S540).

In operation of preparing a shank (S510), a shank including a body and a tip portion is prepared, as shown in FIG. 3. Here, the tip portion of the shank has a smaller thickness than the body.

Next, in operation of depositing a metal powder (S520), a metal powder for a brazing bond is deposited on the tip portion of the shank.

The shank may be subjected to cleaning to remove foreign matter from the surface of the shank before deposition of the metal powder. Cleaning may be carried out in various ways such as plasma cleaning, alcohol or water cleaning, and the like.

The metal powder may be deposited on one or both sides of the tip portion of the shank 110. Alternatively, as shown in FIG. 3, the metal powder may be deposited to surround the tip portion of the shank 110.

Next, in operation of setting diamond particles (S530), diamond particles are set on the tip portion of the shank having the metal powder deposited thereon.

Diamond particle setting may be carried out using a jig, by dropping the diamond particles, or the like.

A mixture of diamond particles and metal powder can be deposited on the shank. However, in this case, there can be difficulty in achieving uniform dispersion of the diamond particles due to a large difference in specific gravity between the metal powder and the diamond particles. Thus, uniform dispersion of the diamond particles is advantageously obtained by depositing the metal powder on the tip portion of the shank, followed by setting the diamond particles on the metal powder.

Then, in operation of forming a brazing bond (S540), the metal powder is melted to form a brazing bond. More specifically, the metal powder is heated above a melting point of the metal powder to melt the metal powder, followed by cooling to form the brazing bond, which secures the diamond particles.

In this operation, the metal powder is heated to a temperature higher than or equal to the melting point of the metal powder and less than a melting point of the shank.

More specifically, the melting point of the metal powder may be determined according to the composition of the metal powder deposited on the tip portion of the shank.

For example, when a metal powder comprising 1~10 wt % of silicon (Si), 5~15 wt % of chromium (Cr), 5~15 wt % of cobalt (Co), and the balance of nickel is deposited on the tip portion of the shank, the melting point of the metal powder may be set in the range from 980~1200° C. in the operation of forming a brazing bond (S540).

If the melting point is less than 980° C., there can be difficulty in melting the metal powder. If the melting point exceeds 1200° C., there can be problems of diamond carburization and increase in manufacturing cost due to heating to high temperature.

Meanwhile, cooling of the metal powder melt may be performed in various ways including forcible cooling, natural cooling, and the like. Here, cooling may be performed within a furnace used for forming the brazing bond.

Although some exemplary embodiments have been described herein, it should be understood by those skilled in the art that these embodiments are given by way of illustration only, and that various modifications, variations, and alterations can be made without departing from the spirit and scope of the present invention. Therefore, the scope of the present invention should be interpreted according to the following appended claims as covering all modifications or variations induced from the appended claims and equivalents thereof.

LIST OF REFERENCE NUMERALS

| | |
|---|---|
| 100: Diamond tool | 110: Shank |
| 111: Body | 112: Tip portion |
| 120: Brazing bond layer | 121: Diamond particles |
| 122: Brazing bond | 401: Object to be cut |

What is claimed is:

1. A diamond tool comprising:
a body with a thickness of 1 mm to 2 mm;
a tip portion formed along an edge of the body, the tip portion being thinner than the body; and
a brazing bond layer having a brazing bond and diamond particles having a particle size of 25 to 50 meshes, wherein the brazing bond is formed on the tip portion to secure the diamond particles with the brazing bond,
wherein the brazing bond layer has a greater thickness than a difference between half the thickness of the body and half the thickness of the tip portion, such that some parts of the body can penetrate into a surface of an object to be cut,
wherein the tip portion has a plane section with a uniform thickness,
wherein an outermost surface of the tip portion is convexly curved in a plane perpendicular to the plane section,
wherein a value obtained by subtracting a difference between half the thickness of the body and half the thickness of the tip portion from the thickness of the brazing bond layer ranges from 10% to 70% the particle size of the diamond particles, and
wherein the tip portion has a thickness ranging from 50% to 80% the thickness of the body.

2. The diamond tool according to claim 1, wherein the diamond particles are arranged in a single layer on the brazing bond layer.

3. The diamond tool according to claim 1, wherein the outermost surface of the tip portion has a radius of curvature greater than or equal to half the thickness of the plane section of the tip portion.

4. The diamond tool according to claim 1, wherein the diamond tool is a flat blade type diamond tool.

* * * * *